United States Patent [19]

Hamprecht et al.

[11] Patent Number: 5,028,701
[45] Date of Patent: Jul. 2, 1991

[54] MONAZO COMPOUNDS CONTAINING A 1-PHENYL-2-PYRAZOLINE COUPLING COMPONENT

[75] Inventors: Rainer Hamprecht, Odenthal-Blecher; Manfred Hoppe, Kuerten, both of Fed. Rep. of Germany

[73] Assignee: Bayer Aktiengesellschaft, Leverkusen, Fed. Rep. of Germany

[21] Appl. No.: 366,797

[22] Filed: Jun. 15, 1989

[30] Foreign Application Priority Data

Jun. 24, 1988 [DE] Fed. Rep. of Germany ....... 3821339

[51] Int. Cl.$^5$ ..................... C09B 29/01; C09B 29/34; D06P 1/18; D06P 3/42; D06P 3/54
[52] U.S. Cl. ................................. 534/799; 534/593; 534/597; 534/735; 534/887
[58] Field of Search ............... 534/593, 597, 799, 735, 534/856

[56] References Cited

U.S. PATENT DOCUMENTS 3,962,209 6/1976 Gotteschlich et al. ............. 534/597
4,619,993 10/1986 Baumann ............................ 534/735

FOREIGN PATENT DOCUMENTS 630494 4/1963 Belgium ............................. 534/799
57-141451 9/1982 Japan ................................. 534/799
972956 10/1964 United Kingdom ................ 534/611

OTHER PUBLICATIONS

GOSEI, Chemical Abstracts, vol. 100, No. 140812z (1984).

Haehnle et al., Chemical Abstracts, vol. 98, No. 117142n (1983).
Leuchs et al. Chemical Abstracts, vol. 60, No. 16022g (1964).
Sumitomo II., Chemical Abstracts, vol. 98, No. 91011s (1983).

*Primary Examiner*—Mary C. Lee
*Assistant Examiner*—Fiona T. Powers
*Attorney, Agent, or Firm*—Sprung, Horn, Kramer & Woods

[57] ABSTRACT

Disperse dyestuffs of the formula

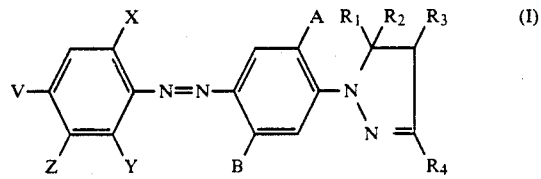

in which
A/B denotes H, alkyl, Cl or O-alkyl,
$R_1$, $R_2$, $R_3$ denote H or alkyl,
$R_4$ denotes alkyl, aryl or COO-alkyl,
$R_5$ denotes alkyl or aryl,
Y denotes H or CN,
X denotes $NO_2$, Cl, Br, CN or $SO_2$-alkyl,
V denotes $NO_2$, Cl, Br, $COOR_5$, $COR_5CF_3$ or alkyl and
Z denotes H, Cl, Br, SCN or CN, are very color-strong and are suitable in particular for the dyeing of polyester by a wide range of methods.

6 Claims, No Drawings

MONAZO COMPOUNDS CONTAINING A 1-PHENYL-2-PYRAZOLINE COUPLING COMPONENT

The invention relates to virtually water insoluble nonionic azo dyestuffs of the formula

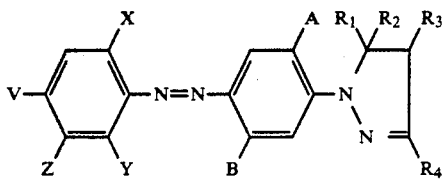

in which, independently of one another,
A/B denotes H, alkyl, Cl or O-alkyl,
$R_1$, $R_2$, $R_3$ denote H or alkyl,
$R_4$ denotes alkyl, aryl or COO-alkyl,
$R_5$ denotes alkyl or aryl,
Y denotes H or CN,
X denotes $NO_2$, Cl, Br, CN or $SO_2$-alkyl,
V denotes $NO_2$, Cl, Br, $COOR_5$, $COR_5$, $CF_3$ or alkyl and
Z denotes H, Cl, Br, SCN or CN,
with the proviso that Z is Cl, Br, SCN or CN, if Y is H, and where the alkyl radicals, in whatever context they are mentioned, have 1 to 4 C atoms and the aryl radicals are preferably phenyl radicals which can be substituted by Cl or $C_1$–$C_4$-alkyl.

Those dyestuffs of the formula I are preferred in which
A denotes H, $CH_3$ or Cl,
B denotes H, $CH_3$, Cl or O-alkyl,
$R_1$–$R_3$ denote H or alkyl,
$R_4$, $R_5$ denote alkyl or aryl,
Y denotes CN or H,
X denotes $NO_2$, Cl, Br, CN or $SO_2$-alkyl,
V denotes $NO_2$, Cl, Br, $COOR_5$ or alkyl and
Z denotes H, Cl, SCN or CN and
in which the abovementioned provisos apply to Z and the alkyl or aryl radicals.

Those dyestuffs of the formula I are particularly preferred in which
A denotes H or $CH_3$,
B denotes H, $CH_3$ or Cl,
$R_1$–$R_3$ denote H or $C_1$–$C_4$-alkyl,
$R_4$ denotes $C_1$–$C_4$-alkyl,
Y denotes CN or H,
X denotes $NO_2$, Cl, Br or CN,
V denotes $NO_2$, Cl, Br or $C_1$–$C_4$-alkyl (preferably $CH_3$) and
Z denotes H, SCN or CN,
with the proviso that Z is SCN or CN, if Y is H.

Very particular preference is given, on the one hand, to dyestuffs of the formula I in which
A denotes $CH_3$ or preferably H,
B denotes H, Cl or preferably $CH_3$,
$R_1$–$R_3$ denote H or $C_1$–$C_2$-alkyl,
$R_4$ denotes $C_1$–$C_2$-alkyl,
Y denotes CN,
X denotes CN or $NO_2$,
V denotes Cl, Br or preferably $NO_2$, and
Z denotes H,
and, on the other hand, to those of the formula I in which
A denotes $CH_3$ or preferably H,
B denotes H, Cl or preferably $CH_3$,
$R_1$–$R_3$ denote H or $C_1$–$C_2$-alkyl,
$R_4$ denotes $C_1$–$C_2$-alkyl,
Y denotes H,
X denotes CN or preferably $NO_2$,
V denotes $NO_2$ and
Z denotes CN or preferably SCN.

The novel azo dyestuffs of the formula (I) are prepared in a manner known per se, for example by coupling of diazotized anilines of the formula (II)

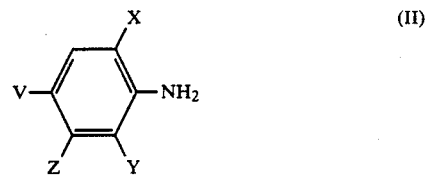

onto coupling components of the formula (III)

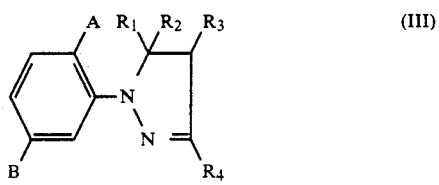

in which
A, B, $R_1$–$R_5$, Y, X, V, Z have the abovementioned meanings.

The diazotization is preferably carried out in concentrated sulphuric or phosphoric acid, or in glacial acetic acid and/or propionic acid.

The coupling components are known or can be prepared by methods known per se (cf., for example, GB-A 972,956, page 3, lines 28–30).

The CN- and SCN-containing dyestuffs are, however, preferably prepared by exchanging the halogen substituent in dyestuffs of the formula I in which at least one of the radicals X, Y, Z represents Cl, Br or I for a CN or SCN radical.

These nucleophilic exchange reactions are also known and described, for example, in the following patent literature:
DE-A 1,544,563=GB-A 1,125,683; DE-A 2,341,109 and 2,456,495, DE-A 1,809,921 and GB-A 1,255,367, GB Patent Specification 1,226,950 and DE-A 3,300,914.

The halogen/cyano exchange by means of copper(I) cyanide, zinc cyanide or mixtures of these cyanides in preferably polar aprotic solvents is preferred.

The azo dyestuffs according to the invention can be used for the dyeing of synthetic textile materials, in particular textile materials from secondary cellulose acetate and cellulose triacetate, and very particularly aromatic polyesters, such as, for example, polyethylene terephthalate, by the dyeing procedures customary for these types of fibre, using aqueous or non-aqueous liquors.

Moreover, the novel dyestuffs can also be used for the spin-dyeing and the dyeing in the mass of thermoplastics, for example polyesters, polystyrenes, polycarbonates and polyolefins.

The novel dyestuffs are also suitable for the use in textile and non-textile transfer printing.

The red to blue dyeings obtained are distinguished by a particularly clear shade in combination with good general fastness properties and high tinctorial strength.

EXAMPLE 1

Preparation of the dyestuff of the formula

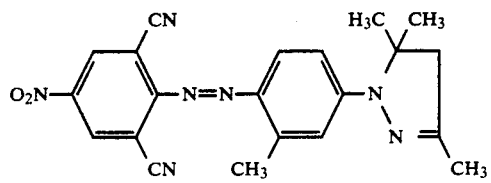

50 g of 2,6-dibromo-4-nitroaniline are stirred into 73 ml of 93% strength sulphuric acid and diazotized at 30° C. with 31 ml of 40% strength nitrosylsulphuric acid. Stirring is continued for 3 hours. The diazonium salt solution obtained is poured onto 630 g of ice, and the nitrite excess is destroyed. 35.5 g of 1-(m-tolyl)-3,5,5-trimethylpyrazoline are added to this solution. Stirring is continued for 5 hours, the product is filtered off with suction and washed with water. Yield of the dibromo dyestuff: 82 g.

50 g of the dibromo dyestuff thus obtained are suspended in 120 ml of dimethylformamide. After the addition of 5.4 g of copper cyanide and 8.2 g of zinc cyanide, the mixture is heated at 105° C. for 5 hours. The product is precipitated with 180 ml of methanol, filtered off with suction, washed with methanol and water, and dried. This gives 27.2 g of the dyestuff of the formula 1; it dyes polyester fibers in a brilliant blue shade having good fastness properties.

Using an analogous or similar procedure, the dyestuffs listed in the following table are obtained; they dye polyester in the shades mentioned and the dyeings obtained have good fastness properties.

-continued
| | | |
|---|---|---|
| 8. | 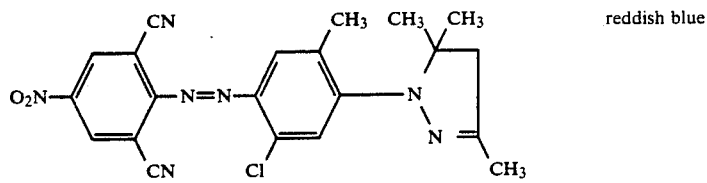 | reddish blue |
| 9. | 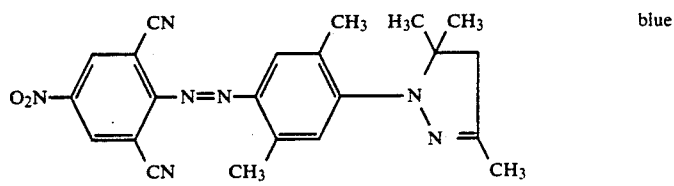 | blue |
| 10. | 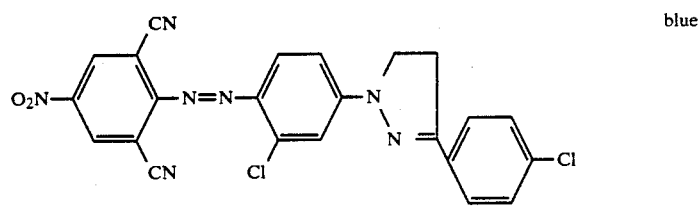 | blue |
| 11. | 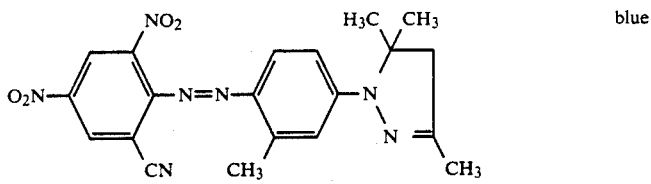 | blue |
| 12. | 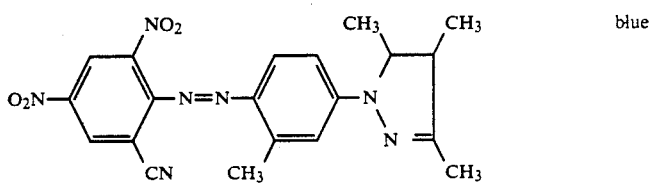 | blue |
| 13. | 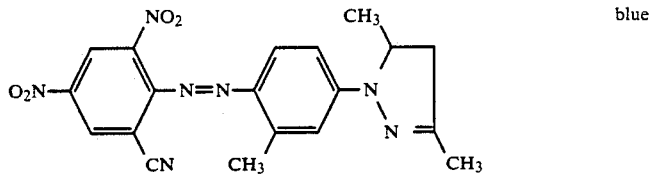 | blue |
| 14. | 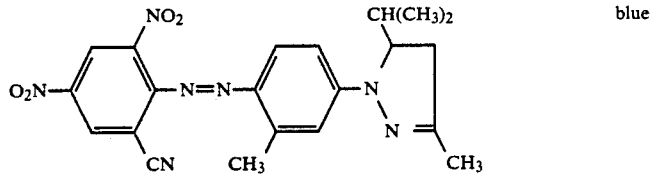 | blue |
| 15. | 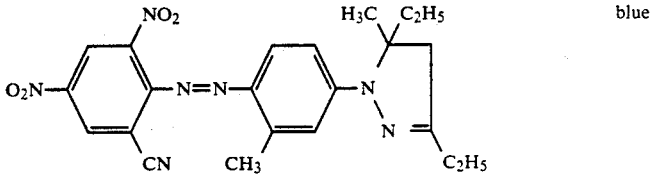 | blue |

-continued
| | | |
|---|---|---|
| 16. | 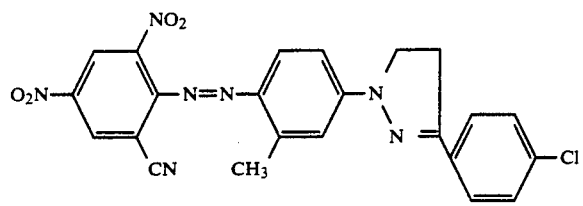 | greenish blue |
| 17. | 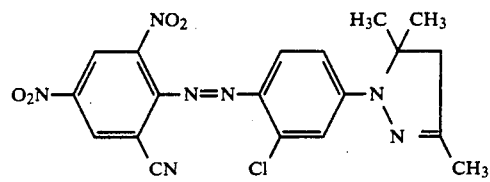 | reddish blue |
| 18. | 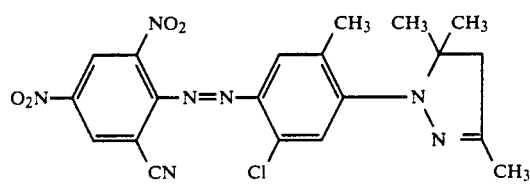 | reddish blue |
| 19. | 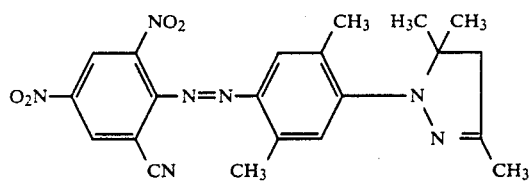 | blue |
| 20. | 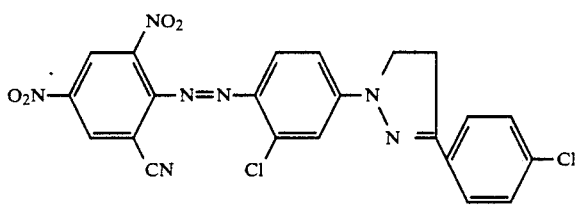 | blue |
| 21. | 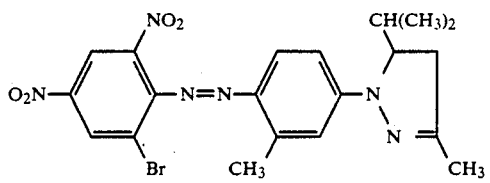 | reddish blue |
| 22. | 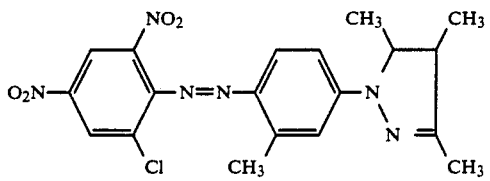 | reddish blue |
| 23. | 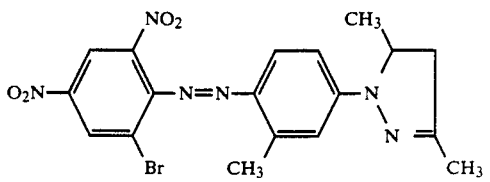 | reddish blue |

-continued
| 24. | 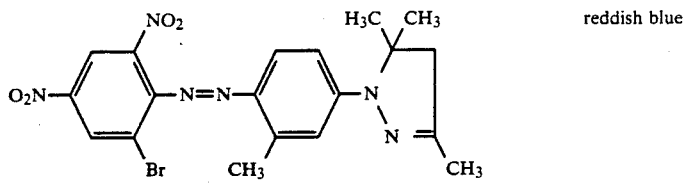 | reddish blue |
| --- | --- | --- |
| 25. | 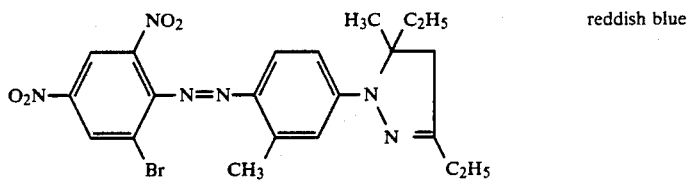 | reddish blue |
| 26. | 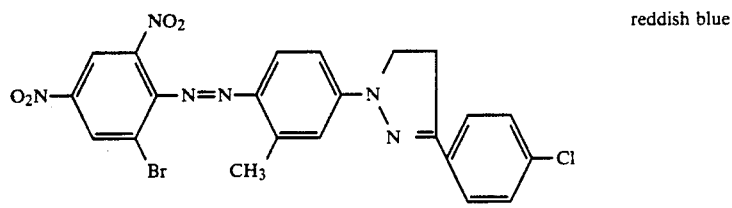 | reddish blue |
| 27. | 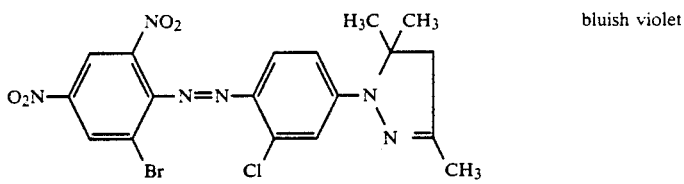 | bluish violet |
| 28. | 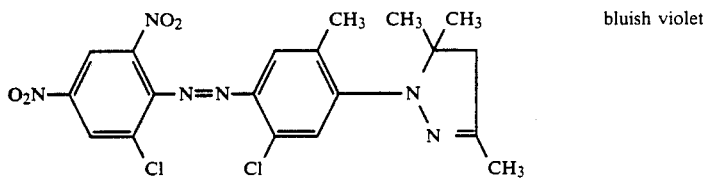 | bluish violet |
| 29. | 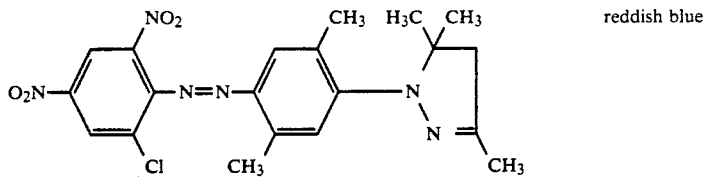 | reddish blue |
| 30. | 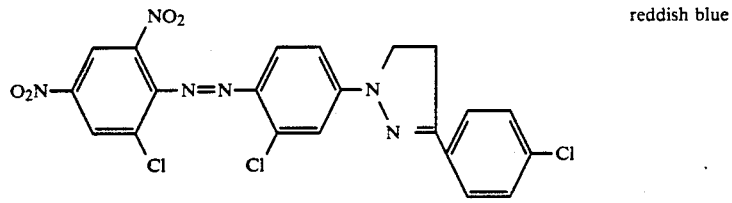 | reddish blue |
| 31. | 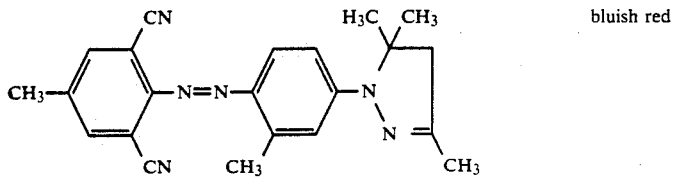 | bluish red |

-continued
| | | |
|---|---|---|
| 32. | 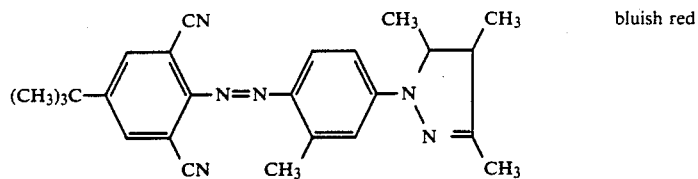 | bluish red |
| 33. | 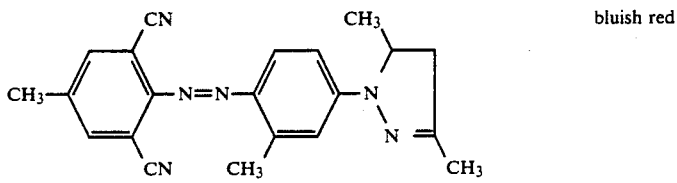 | bluish red |
| 34. | 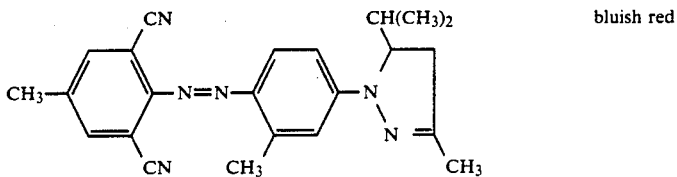 | bluish red |
| 35. | 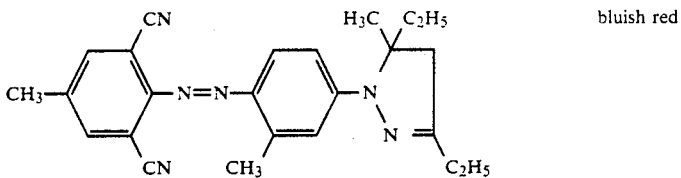 | bluish red |
| 36. | 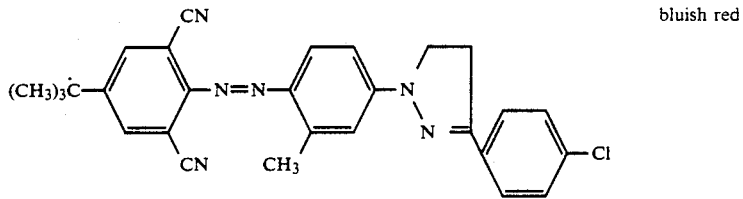 | bluish red |
| 37. | 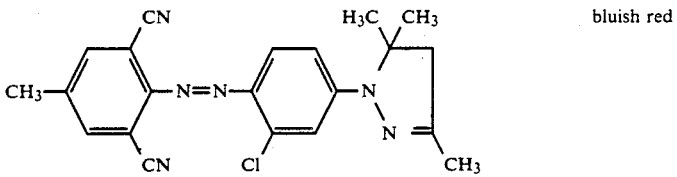 | bluish red |
| 38. | 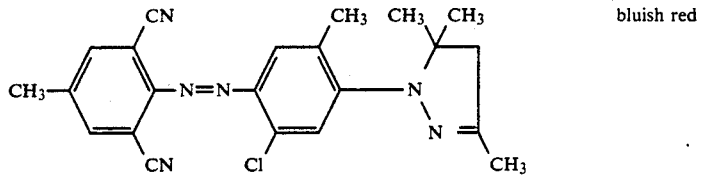 | bluish red |
| 39. | 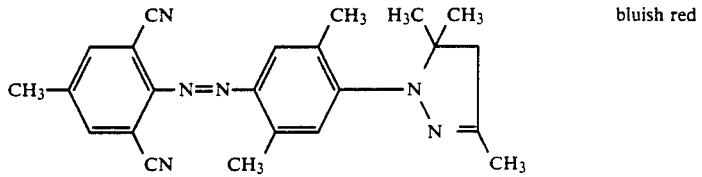 | bluish red |

-continued
| | | |
|---|---|---|
| 40. |  | bluish red |
| 41. | 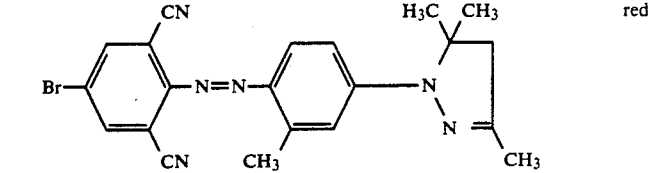 | reddish violet |
| 42. | 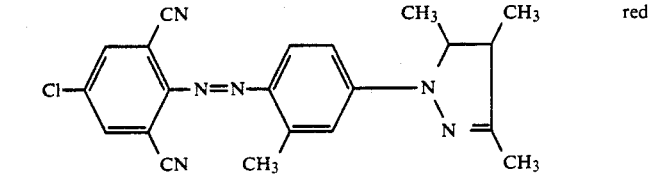 | reddish violet |
| 43. | 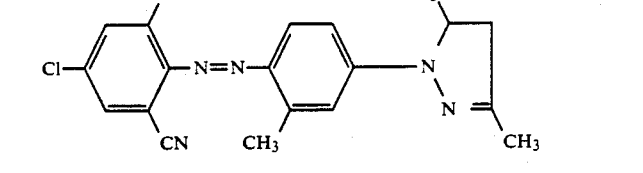 | reddish violet |
| 44. | 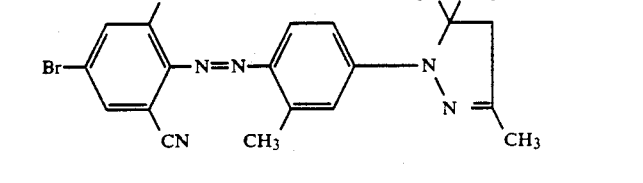 | reddish violet |
| 45. | 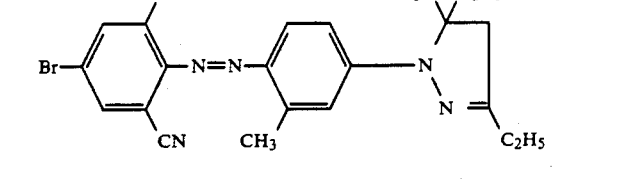 | reddish violet |
| 46. | 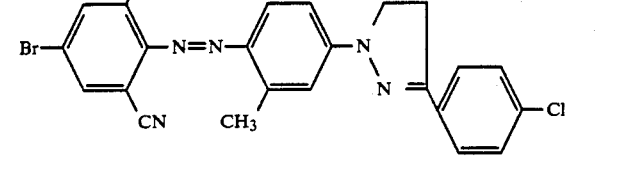 | violet |
| 47. | 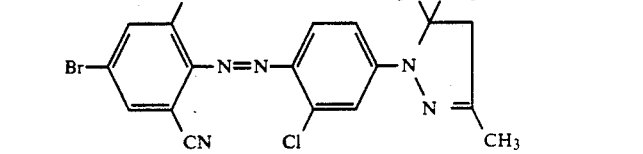 | reddish violet |

-continued
| | | |
|---|---|---|
| 48. | 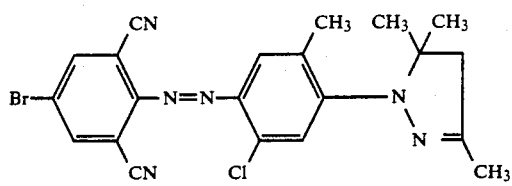 | reddish violet |
| 49. | 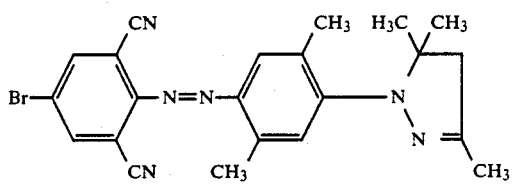 | reddish violet |
| 50. | 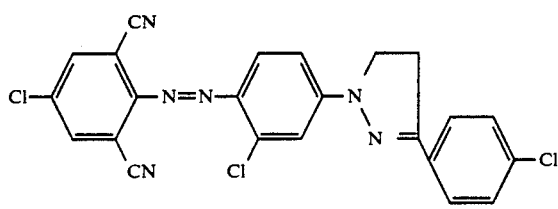 | reddish violet |
| 51. | 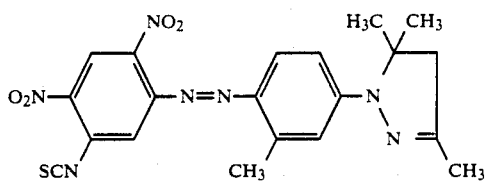 | blue |
| 52. | 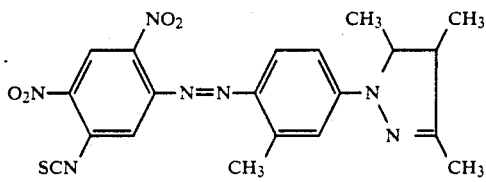 | blue |
| 53. | 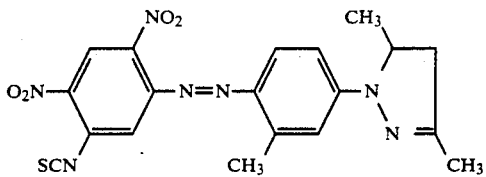 | blue |
| 54. | 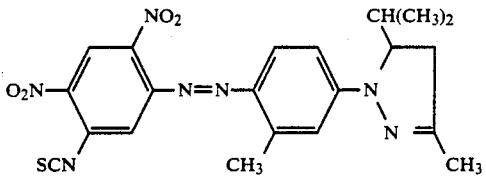 | blue |
| 55. | 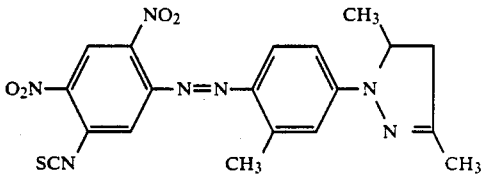 | blue |

-continued

| | | |
|---|---|---|
| 56. | 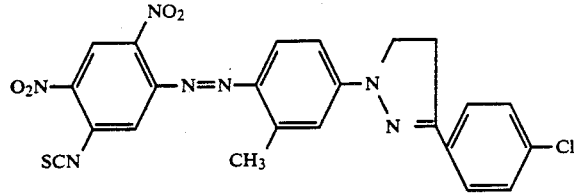 | blue |
| 57. | 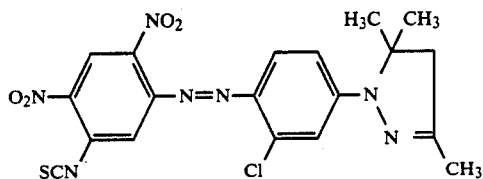 | reddish blue |
| 58. | 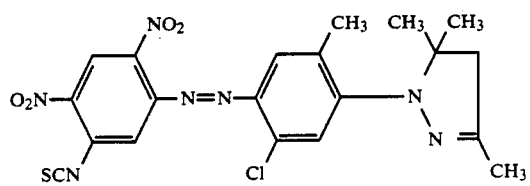 | reddish blue |
| 59. | 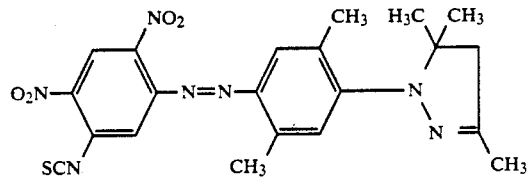 | blue |
| 60. | 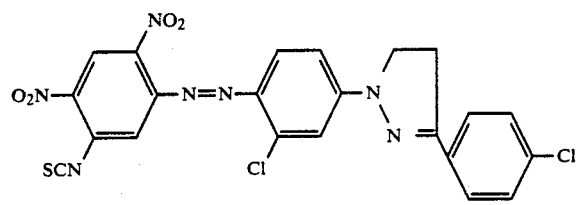 | blue |

We claim:
1. An azo dyestuff of the formula

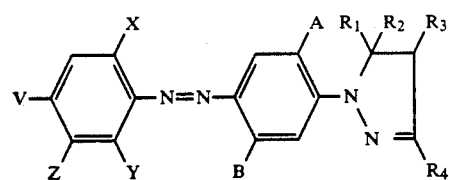 (I)

in which, independently of one another,
A denotes H,
B denotes H, or CH$_3$,
R$_1$, R$_2$, denote C$_1$-C$_2$-alkyl,
R$_3$ denotes H or C$_1$-C$_2$-alkyl,
R$_4$ denotes C$_1$-C$_2$-alkyl,
Y denotes CN,
X denotes NO$_2$ or CN,
V denotes NO$_2$, and
Z denotes H.

2. An azo dyestuff according to claim 1, wherein
A denotes H,
B denotes CH$_3$,
R$_1$ and R$_2$ denote C$_1$-C$_2$-alkyl,
R$_3$ denote H or C$_1$-C$_2$-alkyl,
R$_4$ denotes C$_1$-C$_2$-alkyl, Y denotes CN,
X denotes CN or NO$_2$,
V denotes NO$_2$ and
Z denotes H.

3. An azo dyestuff according to claim 1, wherein
A denotes H,
B denotes CH$_3$,
R$_1$ and R$_2$ denote C$_1$-C$_2$-alkyl,
R$_3$ denotes H or C$_1$-C$_2$-alkyl,
R$_4$ denotes C$_1$-C$_2$-alkyl,
Y denotes CN,
X denotes NO$_2$,
V denotes NO$_2$ and
Z denotes H.

4. An azo dyestuff according to claim 1 of the formula

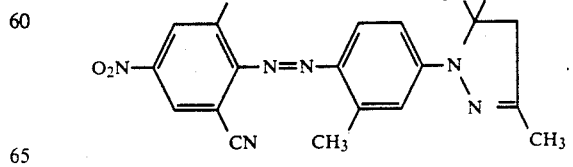

5. An azo dyestuff according to claim 1 of the formula

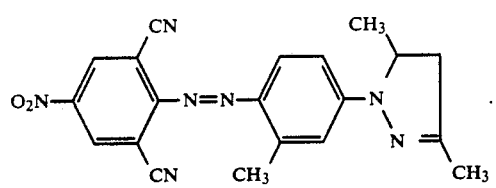
6. An azo dyestuff according to claim 1 of the formula
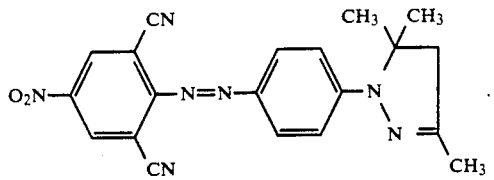
* * * * *